(12) United States Patent
Nagasawa et al.

(10) Patent No.: US 7,434,982 B2
(45) Date of Patent: Oct. 14, 2008

(54) MICRO MIXING AND REACTION DEVICE

(75) Inventors: Hideharu Nagasawa, Minami-Ashigara (JP); Kazuhiro Mae, Kyoto (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/854,747

(22) Filed: May 27, 2004

(65) Prior Publication Data
US 2005/0007872 A1    Jan. 13, 2005

(30) Foreign Application Priority Data
May 30, 2003  (JP)  ............................ 2003-154403
Jul. 1, 2003   (JP)  ............................ 2003-189656

(51) Int. Cl.
*B01F 5/00*    (2006.01)
*B01F 15/06*   (2006.01)

(52) U.S. Cl. ..................... 366/147; 366/149; 366/173.1; 366/178.1

(58) Field of Classification Search ................. 366/145, 366/167.1, 173.1, 178.1, 178.3, 341, DIG. 1, 366/144, 146–149; 137/602; 138/39, 114; 239/416.4, 416.5, 428, 132.1, 139
See application file for complete search history.

(56) References Cited

U.S. PATENT DOCUMENTS

| | | | |
|---|---|---|---|
| 324,005 A * | 8/1885 | Burrell ..................... 239/417.3 |
| 401,021 A * | 4/1889 | Fellowes .................... 239/428 |
| 533,400 A * | 1/1895 | Stanley ....................... 239/139 |
| 705,565 A * | 7/1902 | Dye ........................... 239/137 |
| 1,312,735 A * | 8/1919 | Kirby .......................... 239/139 |
| 4,360,497 A * | 11/1982 | Casperson ................... 422/156 |
| 4,958,767 A | 9/1990 | Labrot et al. |
| 6,048,906 A | 4/2000 | Ernst et al. |
| 6,319,469 B1 * | 11/2001 | Mian et al. ...................... 422/64 |
| 2001/0050881 A1 * | 12/2001 | DePaoli et al. ........... 366/167.1 |
| 2002/0175079 A1 | 11/2002 | Christel et al. |
| 2003/0190563 A1 * | 10/2003 | Nagasawa et al. ........... 430/569 |

(Continued)

FOREIGN PATENT DOCUMENTS

CH          563807 A     7/1975

(Continued)

OTHER PUBLICATIONS 54 4 427-439, "Microchemical Industrial Technique" by Kwan-Wen Chen et al., <Journal of Chemical Industry and Engineering>, Table 1, p. 429, vol. 53, No. 4, Apr. 2003).

(Continued)

*Primary Examiner*—David L Sorkin
(74) *Attorney, Agent, or Firm*—Sughrue Mion, PLLC

(57) ABSTRACT

There is provided a microdevice in which a plurality of fluids L1, L2 and L3 are caused to pass through respective fluid supply passages and flow together in one mixing reaction flow path, and the fluids are diffused in the normal direction of the contact interface thereof while being allowed to flow as a thin layer shaped laminar flow, by which mixing or reaction is carried out. The fluid supply passages are of a concentric multiple cylindrical construction to concentrically laminate the fluids L1, L2 and L3 joined together in the mixing reaction flow path, and the opening width near a joining point of the fluids is reduced to contract the flow.

21 Claims, 10 Drawing Sheets

U.S. PATENT DOCUMENTS

2004/0008572 A1* 1/2004 Stuart .................. 366/162.4
2005/0036921 A1* 2/2005 Nagasawa et al. ........... 422/130

FOREIGN PATENT DOCUMENTS

| | | |
|---|---|---|
| CN | 2163358 Y | 4/1994 |
| DE | 19925184 A1 | 11/2000 |
| DE | 10148615 A1 | 4/2003 |
| JP | 6186656 A | 7/1994 |
| JP | 6226085 A | 8/1994 |
| JP | 2002-282682 A | 10/2002 |
| JP | 2002292274 A | 10/2002 |
| JP | 2003-502144 A | 1/2003 |
| JP | 2003001077 A | 1/2003 |
| WO | WO 00/62913 A1 | 10/2000 |
| WO | WO 00/78438 A1 | 12/2000 |

OTHER PUBLICATIONS

Japanese Office Action dated Apr. 11, 2008 issued in Japanese Application No. 2003-189656.

* cited by examiner

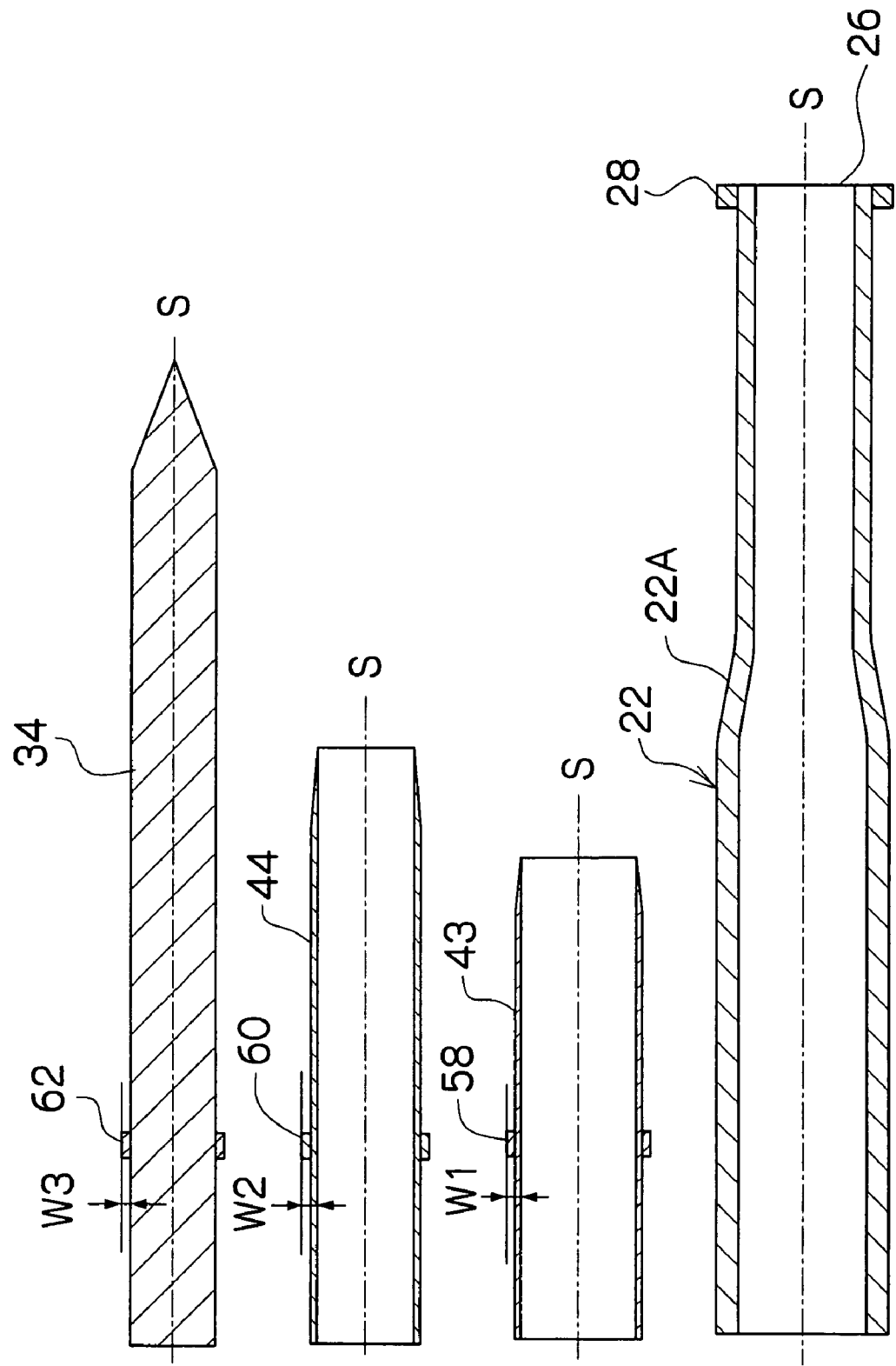

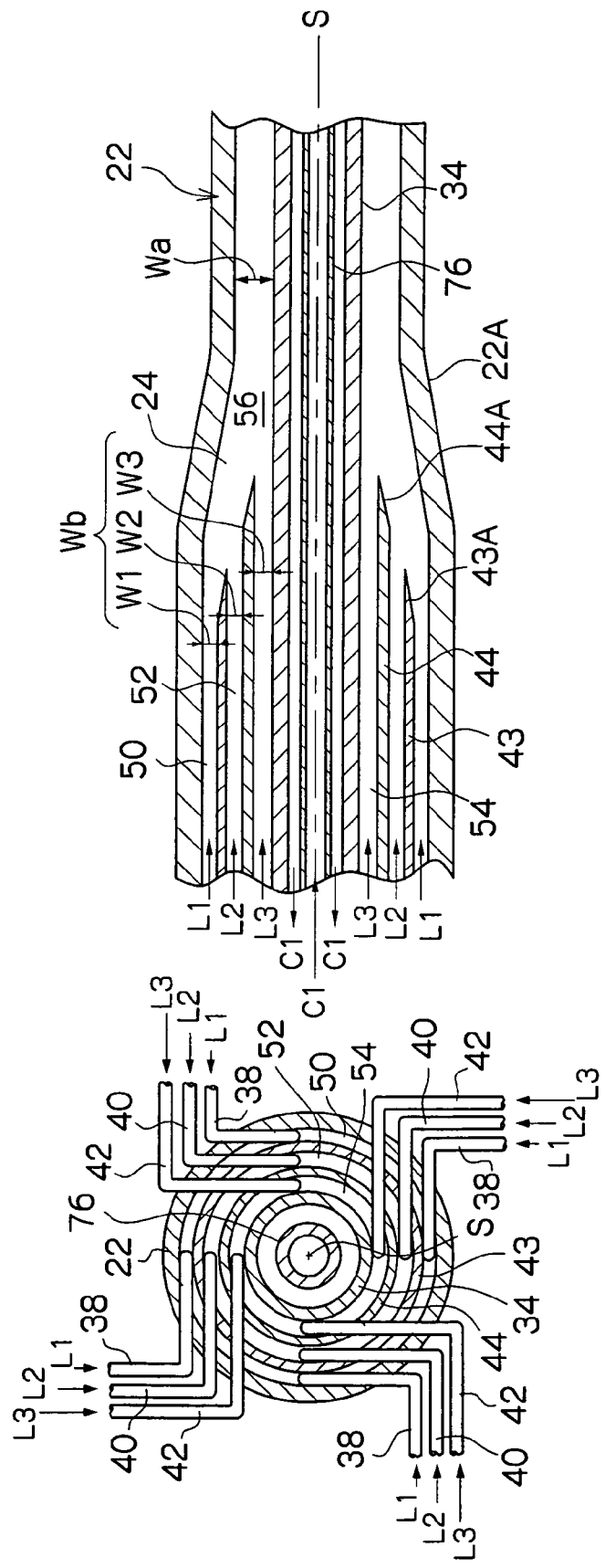

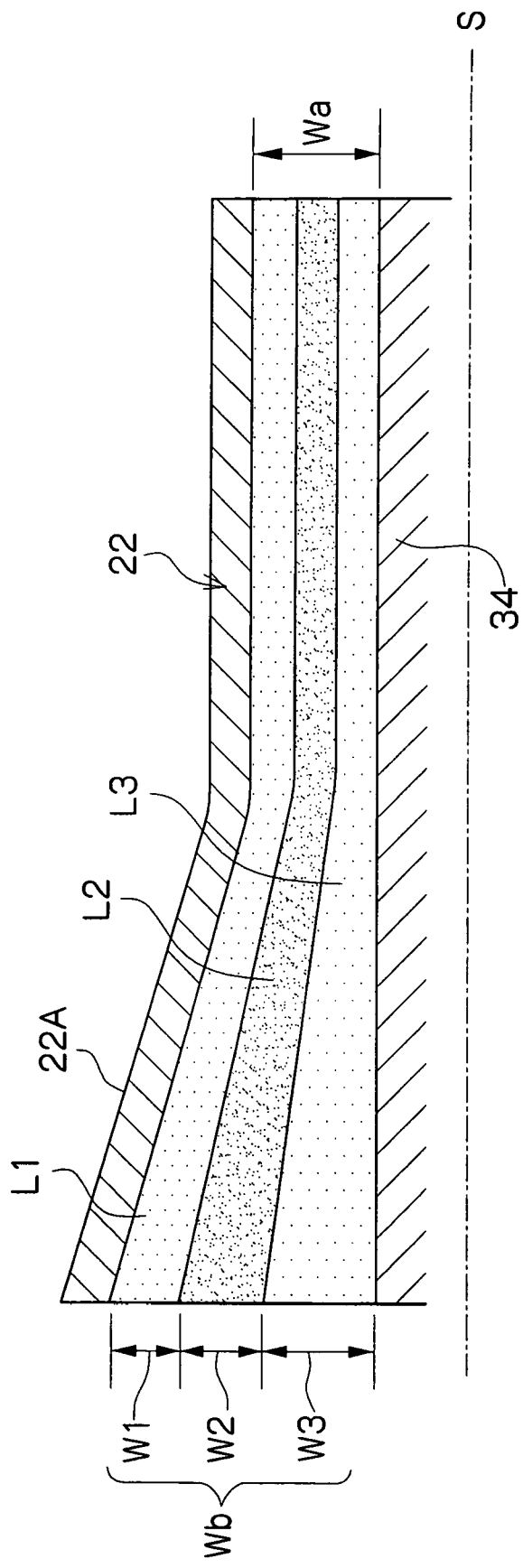

(EXAMPLES OF MIXING AND REACTION PROCESSES)

MICRO MIXING AND REACTION DEVICE

BACKGROUND OF THE INVENTION

1. Field of the Invention

The present invention relates to a microdevice. More particularly, it relates to a microdevice which manufactures materials and products by mixing or reaction of fluids in the fields of chemical industry and pharmaceutical industry, and specifically in which a plurality of fluids are caused to pass through respective fluid supply passages and flow together in one mixing reaction flow path, and the fluids are diffused in the normal direction of the contact interface thereof while being allowed to flow as a thin layer shaped laminar flow, by which mixing or reaction is carried out.

2. Description of the Related Art

Recently, in the chemical industry or the pharmaceutical industry relating to the manufacture of medicines, reagents, etc., a new manufacturing process using a minute vessel called a micromixer or a microreactor has been developed. The micromixer or the microreactor is provided with a minute space (mixing reaction flow path) which connects with a plurality of fine fluid supply passages and has a circle equivalent diameter (an equivalent diameter in the case where the cross section of the minute space is converted into a circle) of about several micrometers to several hundred micrometers. By this configuration, a plurality of fluids passing through the fluid supply passages are allowed to flow together in the minute space to mix the fluids or to subject the fluids to chemical reaction while mixing. The micromixer and the microreactor have a common basic construction. In some cases, a device in which the fluids are mixed is called a micromixer, and a device in which the fluids are subjected to chemical reaction when they are mixed is called a microreactor. In the present invention, a device having a minute space usable as the micromixer and the microreactor is called a microdevice.

Such microdevices have been disclosed, for example, in PCT International Unexamined Patent Publication No. WO 00/62913, National Publication of International Patent Application No. 2003-502144, and Japanese Patent Application Publication No. 2002-282682. Any of these microdevices is configured so that two kinds of fluids are caused to pass through respective fine fluid supply passages and are introduced into a minute space as a very thin layer shaped laminar flow, by which two kinds of fluids are mixed and allowed to react with each other in the minute space.

Next, explanation will be given of points where the mixing and reaction accomplished by the above-described microdevice differ from the batch mixing and reaction using a stirring tank etc. Since chemical reaction generally takes place due to meeting of molecules at an interface of reaction fluids, if the reaction is carried out in a minute space, the interface area increases relatively, so that the reaction efficiency increases remarkably. Also, for the diffusion itself of molecules, the diffusion time is proportional to the square of distance. This means that even if the reaction fluids are not mixed positively as the size of minute space is decreased, the mixing proceeds due to the diffusion of molecules, and the reaction takes place easily. Also, in a minute space, a flow in which laminar flow is dominant is provided because the size is small, and the fluids are diffused in the direction perpendicular to the flow while flowing in a laminar flow state, by which mixing or reaction is carried out.

By using such a microdevice, the mixing time, reaction time, mixing temperature, and reaction temperature of fluids can be controlled with high accuracy, for example, as compared with the conventional batch system using a large-volume tank etc. as a place for mixing or reaction. Also, in the case of the batch system, especially for fluids whose reaction time is short, reaction proceeds on the reaction contact surface at the early stage of mixing, and further a primary product yielded by the reaction of fluids is successively subjected to reaction in the tank, so that there is a fear that a inhomogeneous reaction product is yielded. On the other hand, in the case of the microdevice, the fluid flows continuously without staying in the minute space, so that a primary product yielded by the reaction of fluids is not successively subjected to reaction in the minute space. Therefore, a pure primary product, which has been difficult to take out conventionally, can be taken out.

Also, when a small quantity of a chemical substance manufactured by experimental manufacturing equipment is manufactured in high volume by large-scale manufacturing equipment, conventionally, much labor and time have been required to obtain reproducibility of the experimental manufacturing equipment in the large-scale batch manufacturing equipment. However, by a numbering-up idea in which manufacturing lines using a microdevice are arranged in parallel according to the production quantity, the labor and time for obtaining such reproducibility may be decreased significantly.

However, the microdevice requires a very narrow fluid supply passage of about several micrometers to several hundred micrometers. Therefore, in manufacturing the microdevice, a special precision microfabrication technique such as photolithoetching, electrical discharge machining technique, and optical molding method is required, so that not only the manufacturing period of time is long but also the manufacturing cost is high.

However, if an attempt is made to manufacture a microdevice without using the special precision microfabrication technique, the opening width of fluid supply passage capable of being manufactured is limited, so that the thicknesses of fluids flowing together in the mixing reaction flow path, which is a minute space, through a plurality of fluid supply passages increase. Thereby, the diffusion time for diffusing the fluids in the normal direction of the contact interface of fluids is made long, which presents a problem in that rapid and homogeneous mixing or reaction, which is a feature of microdevice, cannot be carried out.

SUMMARY OF THE INVENTION

The present invention has been made in view of the above situation, and accordingly an object of the present invention is to provide a microdevice in which the thickness of each fluid in a mixing reaction flow path can be made thin without the need for a special precision microfabrication technique as in a case where the precision microfabrication technique is used; moreover the manufacturing period of time can be shortened and the manufacturing cost can be reduced; mixing or reaction can be carried out rapidly and homogeneously as compared with the conventional microdevice; and further a design change as a result of a change in quantity of flow can be made easily with high accuracy.

To achieve the above object, a first aspect of the present invention provides a microdevice in which a plurality of fluids are caused to pass through respective fluid supply passages and flow together in one mixing reaction flow path, and the fluids are diffused in the normal direction of the contact interface of the fluids while being allowed to flow as a thin layer shaped laminar flow, by which mixing or reaction is carried out, wherein the fluid supply passages are of a concentric multiple cylindrical construction to concentrically laminate the fluids joined together in the mixing reaction flow path, and the opening width near a joining point of the fluids is reduced to contract the flow.

The term "reaction" in the present invention includes a reaction accompanied by mixing. As the kind of reaction, various reaction modes of organic or inorganic substances such as ionic reaction, oxidation-reduction reaction, thermal reaction, catalytic reaction, radical reaction, and polymerization reaction are included. Also, the fluid includes liquid, gas, solid-liquid mixture in which metallic fine particles etc. are dispersed in liquid, solid-gas mixture in which metallic fine particles etc. are dispersed in gas, gas-liquid mixture in which gas is dispersed in liquid without being dissolved, and the like. The plural fluids include not only a case where the kinds of fluids are different or the chemical compositions are different but also a case where states such as temperature or solid-liquid ratio are different. The phase "the opening width near a joining point of the fluids is reduced to contract the flow" includes a case where the contraction start position lies in front of the joining point, that is, in a rear end portion of fluid supply passage in addition to a case where contraction start position lies in the mixing reaction flow path of fluid.

According to the first aspect of the present invention, since the opening width near a joining point at which the fluids pass through the fluid supply passages and flow together in one mixing reaction flow path is reduced to contract the flow, even if the opening width of mixing reaction flow path is relatively large, the thickness of each fluid joined together by the mixing reaction flow path can be made thin by flow contraction. Therefore, the opening width of fluid supply passage can be formed larger than the conventional microdevice. Also, since the fluid supply passages are of a concentric multiple cylindrical construction, the fluid supply passages can be formed by lapping a plurality of cylindrical tubes coaxially, so that the diameter of each cylindrical tubes can be considerably large as compared with the opening width of fluid supply passage. Therefore, unlike the conventional example, a high-performance microdevice, which is similar to the microdevice manufactured by using the special precision microfabrication technique, can be manufactured by using a general-purpose machining technique, for example, a lathe and a drilling machine without the use of the special precision microfabrication technique. Needless to say, the microdevice in accordance with the present invention may be manufactured by using the special precision microfabrication technique such as photolithoetching, electrical discharge machining technique, or optical molding method, or may be manufactured by combining the general-purpose machining technique with the precision microfabrication technique.

If the degree of contraction is increased, the thickness of each fluid in the mixing reaction flow path can be made as thin as possible. Therefore, rapid and homogeneous mixing or reaction, which is a feature of microdevice, can be improved further as compared with the conventional microdevice.

In the conventional microdevice, when the quantity of the flow is changed, especially when the experimental level is transferred to the manufacturing level, a numbering-up idea in which a plurality of microdevices are arranged in parallel to increase the throughput must inevitably be adopted. Thereby, a new technical problem is posed in which fluids must be uniformly distributed to the microdevices.

On the other hand, in the case where the fluid supply passages are of a concentric multiple cylindrical construction as in the microdevice in accordance with the present invention, if the diameter of multiple cylindrical construction is increased without a change of opening width of each fluid supply passage, a circular shape that is a cross-sectional shape of fluid supply passage accordingly increases, so that the capacity of fluid supply passage increases. In this case, since the opening width of fluid supply passage is unchanged, only the diameter of a concentric circle in which a plurality of fluids are laminated in the mixing reaction flow path increases, and the thickness of each fluid is unchanged. Thereby, the quantity of flow can be increased without numbering up of microdevices, so that there is no conventional problem of fluid distribution, and scaling-up can be accomplished easily with high accuracy.

A second aspect of the present invention is characterized in that in the first aspect of the present invention, the opening width of the mixing reaction flow path after flow contraction is not smaller than 1 µm and not larger than 1000 µm. This specifies the size of opening width of mixing reaction flow path, which is a minute space. In this case, without flow contraction, a plurality of (at least two) fluid supply passages are needed, so that the opening width of one fluid supply passage must inevitably be smaller than the opening width of mixing reaction flow path. However, by contracting the flow as in the present invention, the opening width of one fluid supply passage can be made larger than the opening width of mixing reaction flow path, so that the manufacture is made easy.

A third aspect of the present invention is characterized in that in the first or second aspect of the present invention, the fluid supply passages of the concentric multiple cylindrical construction are manufactured by coaxially arranging a cylindrical wall member between a columnar flow straightening member forming the center axis and a cylindrical tube member forming an outer peripheral wall with a spacer corresponding to the opening width of fluid supply passage being interposed, the wall member being shorter than the flow straightening member and the tube member, and a tapered portion for flow contraction is formed near the joining point on at least one of the flow straightening member and the tube member.

According to the third aspect of the present invention, the cylindrical wall member is arranged coaxially in a space of a ring shape in cross section between the columnar flow straightening member forming the center axis and the cylindrical tube member forming the outer peripheral wall with a spacer corresponding to the opening width of fluid supply passage being interposed, the wall member being shorter than the flow straightening member and the tube member in the flow direction. Thereby, a space of a ring shape in cross section having an opening width smaller than the space of a ring shape in cross section (cross section perpendicular to the flow direction of fluid) between the flow straightening member and the cylindrical tube member is formed, and this space serves as the fluid supply passage. Therefore, even if the fluid supply passage is narrow, by simply forming only the spacer so as to have the thickness of fluid supply passage, the flow straightening member, the tube member, and the wall member can be formed so as to have a large diameter. Thereby, unlike the conventional example, a high-performance microdevice, which is similar to the microdevice manufactured by using the special precision microfabrication technique, can be manufactured by using a general-purpose machining technique, for example, a lathe and a drilling machine without the use of the special precision microfabrication technique. Moreover, in the present invention, the tapered portion for flow contraction is formed near the joining point on at least one of the flow straightening member and the tube member. Therefore, the thickness of each fluid joined together in the mixing reaction flow path can be made thin by flow contraction, so that the opening width of fluid supply passage can be formed so as to be larger.

That is to say, in the present invention, the microdevice is of a concentric cylindrical type, and a construction in which the opening width of mixing reaction flow path is decreased to contract the flow of fluid flowing therein is designed. Therefore, the diffusion distance through which the fluids diffuse in the normal direction of the contact interface is decreased, and a microdevice having a construction in which mixing or reaction is completed in a shorter period of time can be manufactured without the use of special precision microfabrication technique.

However, if the flow of fluid is contracted suddenly, flow contraction continues even to behind the flow path for contraction, so that separation of flow from the wall surface occurs, and vortex or stagnation is produced. The vortex or stagnation is unfavorable because it causes a reaction product to stay, and hence makes the reaction product inhomogeneous. Therefore, an important thing in contracting the flow is to avoid sudden flow contraction to prevent separation, vortex, and stagnation of flow from occurring.

Thereupon, in the present invention, the tapered portion for flow contraction is formed near the joining point at which the fluids join together on at least one of the columnar flow straightening member forming the center axis of the concentric multiple cylindrical construction and the tube member forming the outer peripheral wall. Thereby, the flow is not contracted suddenly, but is contracted gently, so that separation from the wall surface, eddy current, stagnation, etc. of flow can be prevented from occurring.

A fourth aspect of the present invention is characterized in that in the third aspect of the present invention, the inclination angle of the tapered portion is not smaller than 1° and smaller than 90° with respect to the axis of the microdevice. This specifies the preferred inclination angle of tapered portion. The inclination angle of tapered portion should be not smaller than 1° and smaller than 90°, preferably not smaller than 1° and not larger than 60°, further preferably not smaller than 1° and not larger than 30° with respect to the axis of the microdevice.

A fifth aspect of the present invention is characterized in that in the third or fourth aspect of the present invention, the tapered portion is of a streamline shape. By making the tapered portion of a streamline shape, the flow of fluid is contracted smoothly, so that separation from the wall surface, eddy current, stagnation, etc. of flow can further be prevented from occurring.

A sixth aspect of the present invention is characterized in that in any one of the first to fifth aspects of the present invention, the start position of contraction is set in front of the joining point or at the joining point or behind with respect to the joining point at which the fluids join together according to the mixing properties or reaction properties of the fluids. In this configuration, three cases of the case where the flow is contracted before the fluids join together, the case where the flow is contracted simultaneously with the joining of fluids, and the case where the flow is contracted after the fluids join together are set. The case may be set according to the mixing properties (diffusion rate) and the reaction properties (reaction rate) of fluids to be handled. It is preferable that the contraction start position with respect to the joining point be set so that the fluid thickness in the mixing reaction flow path is such that mixing or reaction finishes when the diffusion of fluids in the normal direction of the contact interface finishes.

A seventh aspect of the present invention is characterized in that in any one of the first to sixth aspects of the present invention, the fluids are formed by three or more fluids, and the positions of joining points of the fluid supply passages are changed so that the fluids are mixed or allowed to react with each other stepwise. By forming the fluids by three or more fluids and by joining them together in consecutive order, various mixing or reaction processes can be carried out.

An eighth aspect of the present invention is characterized in that in the seventh aspect of the present invention, a plurality of stages of the tapered portions are formed so as to match the stepwise mixing or reaction, whereby the fluids are contracted at many stages. This is a combination of multistage mixing or multistage reaction and multistage contraction, by which not only various mixing or reaction processes can be carried out, but also the configuration can be made such that mixing or reaction finishes when the diffusion of fluids in the normal direction of the contact interface finishes according to the mixing properties and reaction properties of the fluids.

A ninth aspect of the present invention is characterized in that in any one of the first to eighth aspects of the present invention, a plurality of fluid supply ports are arranged at equal intervals in the circumferential direction of the concentric multiple cylindrical construction for each of the fluid supply passages formed into the concentric multiple cylindrical construction. Thereby, the fluids can be supplied uniformly into the fluid supply passages, so that a ring-shaped laminar flow laminated concentrically by the joining in the mixing reaction flow path can be formed surely.

A tenth aspect of the present invention is characterized in that in any one of the first to ninth aspects of the present invention, a temperature control device is provided to control the mixing temperature or reaction temperature of fluid flowing in the mixing reaction flow path. Thereby, the diffusion rate and reaction rate can be controlled.

As described above, according to the microdevice in accordance with the present invention, the thickness of each fluid in the mixing reaction flow path can be made thin without the need for the special precision microfabrication technique in the same way as in the case where the precision microfabrication technique is used, and moreover the manufacturing period of time can be shortened and the manufacturing cost can be reduced. Also, mixing or reaction can be carried out rapidly and homogeneously as compared with the conventional microdevice, and further a design change as a result of a change in quantity of flow can be made easily with high accuracy.

BRIEF DESCRIPTION OF THE DRAWINGS

FIG. 3 is an exploded schematic view of a microdevice in accordance with the present invention before being assembled;

FIG. 4A and FIG. 4B are partially enlarged views of a microdevice in accordance with the present invention;

FIG. 5 is an explanatory view for illustrating the image of flow contraction of a plurality of fluids;

DETAILED DESCRIPTION OF THE PREFERRED EMBODIMENTS

A preferred embodiment of a microdevice in accordance with the present invention will now be described in detail with reference to the accompanying drawings.

Figure 1A:
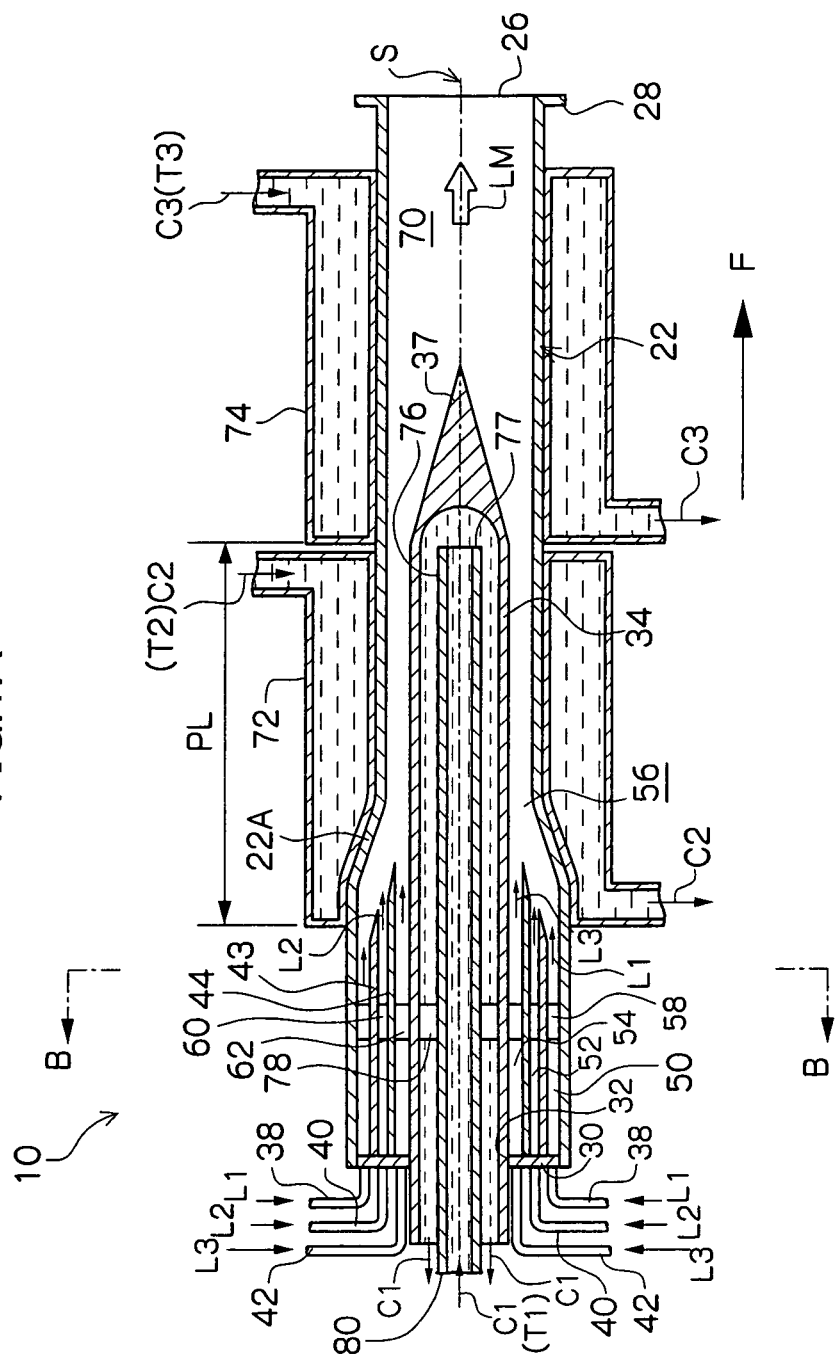
FIG. 1A and FIG. 1B are sectional views for illustrating the general construction of a microdevice in accordance with the present invention.
Figure 1B:
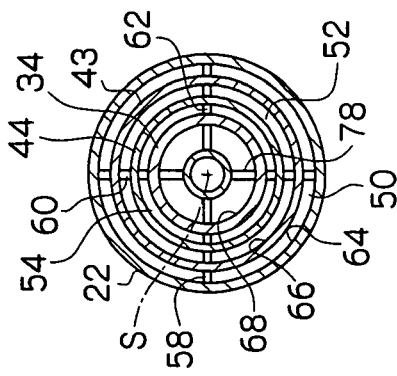

FIG. 1A and FIG. 1B are sectional views showing a construction of a concentric cylindrical microdevice in accordance with the present invention, showing a case where three kinds of fluids L1, L2 and L3 are mixed and allowed to react with each other. The number of fluids is not limited to three, and may be two or more. Also, the same kind of fluid may be present in a plurality of fluids.

As shown in FIG. 1A and FIG. 1B, a microdevice 10 is formed into a columnar shape as a whole, and has a cylindrical tube member 22 constituting a shell of device. The straight line S in FIG. 1A and FIG. 1B designates the axis of device, and the following explanation is given by taking the direction along this axis S as the axial direction of device. In the distal end face of the tube member 22, a discharge port 26 is open to discharge a fluid LM formed after the fluids L1, L2 and L3 have been mixed and allowed to react with each other. Also, at the distal end of the tube member 22, a ring-shaped flange 28 is provided so as to extend on the outer periphery side of the discharge port 26. The flange 28 is connected to a pipe etc. for sending the mixing reaction fluid LM to another microdevice that performs the following processing of the fluid LM.

The proximal end face of the tube member 22 is closed by a disk-shaped cover plate 30, and in the central portion of the cover plate 30 is formed a circular insertion hole 32. In the tube member 22, a columnar flow straightening member 34 is coaxially provided so as to be inserted into the tube member 22 from the proximal end side, and the proximal end portion of the flow straightening member 34 is insertedly supported by the insertion hole 32 of the cover plate 30. Also, at the distal end of the flow straightening member 34, a conical portion 37 whose diameter decreases toward the distal end is formed.

In the tube member 22, a first wall member 43 and a second wall member 44 each having a cylindrical shape are provided in a multiple cylinder form to partition a space in the tube member 22 along the axial direction, and the proximal end faces of these wall members 43 and 44 are fixed to the cover plate 30. These wall members 43 and 44 are arranged coaxially with the tube member 22 and the flow straightening member 34, and partitions the space of a ring shape in cross section between the tube member 22 and the flow straightening member 34 into three portions coaxially. The proportion of partitioning is determined according to the ratio of supply quantity of fluids L1, L2 and L3. The distal ends of the wall members 43 and 44 extend to a tapered portion 22A, described later, of the tube member 22, that is, to a position near the flow contracting position of the microdevice 10. A plurality of (four in this embodiment) spacers 58 are interposed between the inner peripheral surface of the tube member 22 and the outer peripheral surface of the first wall member 43, and a plurality of (four in this embodiment) spacers 60 are interposed between the first wall member 43 and the second wall member 44. Also, a plurality of (four in this embodiment) spacers 62 are interposed between the inner peripheral surface of the second wall member 44 and the outer peripheral surface of the flow straightening member 34. The spacers 58, 60 and 62 each are formed into a rectangular plate shape, and are supported so that both surfaces thereof are in parallel with the flow direction (the direction of arrow F) of the fluids L1, L2 and L3 in the tube member 22. The spacers 58, 60 and 62 connectingly fix the wall members 43 and 44 and the flow straightening member 34 to the tube member 22, and set opening widths W1, W2 and W3 (see FIG. 4A) in the radial direction (the direction perpendicular to the fluid flowing direction) of fluid supply passages 50, 52 and 54. Thereby, the wall members 43 and 44 and the flow straightening member 34 are connectingly fixed to the tube member 22 with a sufficient strength, and thereby are prevented from being displaced from predetermined positions or being deformed by the influence of liquid pressure or gravity of the fluids L1, L2 and L3. Also, the opening widths W1, W2 and W3 are surely kept at preset dimensions.

The spaces of a ring shape in cross section partitioned by the first and second wall members 43 and 44 are referred to as a first fluid supply passage 50, a second fluid supply passage 52, and a third fluid supply passage 54 in sequence from the outside. The cover plate 30 provided at the proximal end face of the tube member 22 is formed with insertion holes communicating with the fluid supply passages 50, 52 and 54. To these insertion holes are connected fluid supply pipes 38, 40 and 42 for supplying the fluids L1, L2 and L3 to the first to third fluid supply passages 50, 52 and 54. Thereby, the fluids L1, L2 and L3 in a pressurized state are supplied from three fluid supply sources (not shown) provided on the upstream side of the microdevice 10 to the first to third fluid supply passages 50, 52 and 54 through the fluid supply pipes 38, 40 and 42.

Also, in the tube member 22, a space of a ring shape in cross section communicating with the fluid supply passages 50, 52 and 54 is formed on the distal end side of the wall members 43 and 44 and on the proximal end side of the conical portion 37 of the flow straightening member 34. This space of a ring shape in cross section serves as a mixing reaction flow path 56 in which the fluids L1, L2 and L3 supplied from the fluid supply passages 50, 52 and 54 are joined together to be mixed or allowed to react with each other.

As shown in FIG. 1B, at distal ends of the first fluid supply passage 50, the second fluid supply passage 52, and the third fluid supply passage 54, a first fluid supply port 64, a second fluid supply port 66, and a third fluid supply port 68, which are open to the mixing reaction flow path 56, are formed, respectively. These fluid supply ports 64, 66 and 68 each are open in a ring shape in cross section along a circular locus around the axis S, and are arranged concentrically with each other. The opening widths W1, W2 and W3 specify the opening areas of the fluid supply ports 64, 66 and 68, respectively. The initial flow velocities of the fluids L1, L2 and L3 introduced into the mixing reaction flow path 56 through the fluid supply ports 64, 66 and 68 are determined according to the opening areas of the fluid supply ports 64, 66 and 68 and the supply quantities of the fluids L1, L2 and L3. The opening widths W1, W2 and W3 are set so that, for example, the flow velocities of the fluids L1, L2 and L3 supplied into the mixing reaction flow path 56 through the fluid supply ports 64, 66 and 68 are equal to each other.

A space on the distal end side of the mixing reaction flow path 56 in the tube member 22 serves as a fluid discharge passage 70 in which the mixing reaction fluid LM, which is formed after the fluids L1, L2 and L3 are mixed or allowed to react with each other in the mixing reaction flow path 56, flows toward the discharge port 26. When the fluid LM is formed by the mixing or reaction of the fluids L1, L2 and L3, the mixing or reaction of the fluids L1, L2 and L3 must be completed in an outlet portion in the mixing reaction flow path 56. Therefore, a path length PL (see FIG. 1A) along the flow direction of the fluids L1, L2 and L3 of the mixing reaction flow path 56 must be set at a length through which the mixing or reaction of the fluids L1, L2 and L3 is completed. It is assumed that the microdevice 10 is always filled with the fluids L1, L2 and L3 and the mixing reaction fluid LM formed by the mixing or reaction of these fluids without a gap, and these fluids always flow from header portions 16, 18 and 20 toward the discharge port 26.

Also, as shown in FIG. 1A, at the outer periphery of the tube member 22, two jackets 72 and 74, in which heat media C2 and C3 having a relatively high heat capacity, such as water or oil, flow, are windingly provided, and the jackets 72 and 74 are connected to a heat medium supply unit, not shown. From the heat medium supply unit, the heat media C2 and C3 are supplied to the jackets 72 and 74 to control the mixing temperature or the reaction temperature of the fluids L1, L2 and L3 in the tube member 22, and are again circulated to the heat medium supply unit. The temperatures T2 and T3 of the heat media C2 and C3 supplied to the jackets 72 and 74 are preferably set appropriately according to the mixing temperature or reaction temperature, the kinds of the fluids L1, L2 and L3, and the like, and the temperatures T2 and T3 may be different from each other. The flow straightening member 34 is hollow and has a thin-wall outer shell, and a heat medium supply pipe 76 having a diameter smaller than the inside diameter of the flow straightening member 34 is inserted in the flow straightening member 34 from the proximal end side thereof. The heat medium supply pipe 76 is supported coaxially with the flow straightening member 34 by a closing plate (not shown) for closing an opening on the proximal end side of the flow straightening member 34 and a plurality of spacers 78. A distal end opening 77 of the heat medium supply pipe 76 reaches a position near the root of the conical portion 37, and in the proximal end face thereof, a supply port 80 is open to supply a heat medium C1 into the flow straightening member 34. The heat medium C1 having a temperature T1 is supplied from the heat medium supply unit to the heat medium supply pipe 76 through the supply port 80, by which the mixing temperature or the reaction temperature is controlled.

As a material for a liquid contact portions used in the microdevice 10, a metallic material such as iron, aluminum, stainless steel, titanium, and various alloys, a resin material such as fluorocarbon resin and acrylic resin, and a glass material such as silicon and glass can be used.

Figure 2:
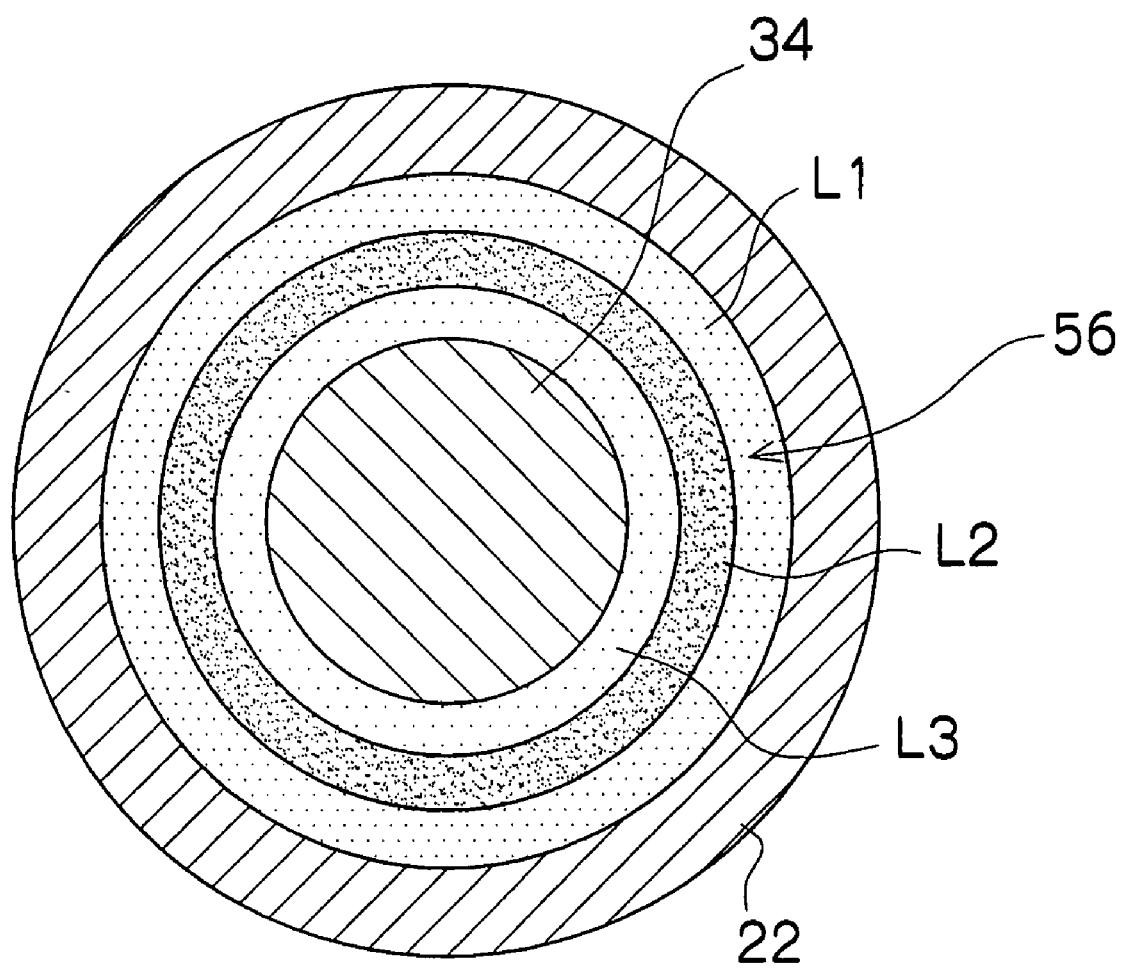
FIG. 2 is a sectional view of a mixing reaction flow path, showing a state in which three fluids flow together in the mixing reaction flow path to form a laminar flow of a ring shape in cross section in which the fluids are laminated concentrically.

In the microdevice 10 constructed as described above, under proper mixing temperature or reaction temperature condition, the fluids L1, L2 and L3 having flown in the fluid supply passages 50, 52 and 54 flow together in the mixing reaction flow path 56 and flow as a laminar flow of a ring shape in cross section laminated in a concentric configuration as shown in FIG. 2. For the three fluids L1, L2 and L3 flowing in the mixing reaction flow path 56, molecules of the fluids L1, L2 and L3 diffuse mutually at the contact interface between the adjacent laminar flows, by which mixing or reaction is carried out. Thereby, homogeneous mixing or reaction of the fluids L1, L2 and L3 can be completed in a short period of time. In this case, it is important that the thickness of fluid in the mixing reaction flow path 56 be decreased, and hence the diffusion distance be shortened. It is necessary that an opening width Wa (see FIG. 4A) of the mixing reaction flow path 56 be not smaller than 1 μm and not larger than 1000 μm.

FIG. 3 is an exploded schematic view of the microdevice 10 constructed as described above before being assembled. In this figure, the flow path for the heat medium C1 formed in the flow straightening member 34 and the like are omitted. When the microdevice 10 is assembled, the cylindrical second wall member 44 is put on the outside of the columnar flow straightening member 34, and the inner peripheral surface of the second wall member 44 is fitted to the spacers 62 formed integrally with the flow straightening member 34. Thereby, a gap corresponding to the thickness of the spacer 62 is formed between the outer peripheral surface of the flow straightening member 34 and the inner peripheral surface of the second wall member 44, and this gap provides the opening width W3 of the third fluid supply passage 54. Next, the cylindrical first wall member 43 is put on the outside of the second wall member 44, and the inner peripheral surface of the first wall member 43 is fitted to the spacers 60 formed integrally with the second wall member 44. Thereby, a gap corresponding to the thickness of the spacer 60 is formed between the outer peripheral surface of the second wall member 44 and the inner peripheral surface of the first wall member 43, and this gap provides the opening width W2 of the second fluid supply passage 52. Next, the tube member 22 is put on the outside of the first wall member 43, and the inner peripheral surface of the tube member 22 is fitted to the spacers 58 formed integrally with the first wall member 43. Thereby, a gap corresponding to the thickness of the spacer 58 is formed between the outer peripheral surface of the first wall member 43 and the inner peripheral surface of the tube member 22, and this gap provides the opening width W1 of the first fluid supply passage 50. Thus, by constructing the microdevice 10 so as to be of a concentric cylindrical shape, the narrow fluid supply passages 50, 52 and 54 can be formed easily. In this case, as seen from FIG. 3, even if the opening widths W1, W2 and W3 of the fluid supply passages 50, 52 and 54 are narrow, the tube member 22, and the first and second wall members 43 and 44 can be formed so as to have a large diameter. Moreover, in the present invention, as shown in a partially enlarged view of FIG. 4A and FIG. 4B, the tapered portion 22A is formed on the tube member 22 so that the opening width of the front end portion of the mixing reaction flow path 56 in a portion 24 near the joining point of fluids is reduced to contract the flow. In this case, it is preferable that, as shown in FIG. 4A, tapered portions 43A and 44A having an inclination substantially parallel with the inclination of the tapered portion 22A of the tube member 22 be formed in the distal end portions of the first and second wall members 43 and 44. Thereby, the flow contraction can be effected smoothly. FIG. 5 is an image view showing a case where the fluids L1, L2 and L3 are contracted by the tapered portion 22A. The configuration is made such that when the sum of the opening widths W1, W2 and W3 of the fluid supply passages 50, 52 and 54 is taken as Wb (identical to the total thickness of the fluids L1, L2 and L3 before being contracted), and the opening width of the mixing reaction flow path 56 after flow contraction is taken as Wa (identical to the total thickness of the fluids L1, L2 and L3 after being contracted), the relationship of Wb/Wa<1 holds. In this case, if an attempt is made to manufacture a microdevice without flow contraction as in the conventional example, a plurality of (at least two) fluid supply passages 50, 52 and 54 are needed, so that the opening width of one flow supply passage must inevitably be smaller than the opening width Wa of the mixing reaction flow path 56. However, by contracting the flow as in the present invention, the opening width of one fluid supply passage can be made larger, for example, than the opening width Wa of the mixing reaction flow path 56.

Thereupon, unlike the conventional example, a high-performance microdevice, which is similar to the microdevice manufactured by using the special precision microfabrication technique, can be manufactured by using a general-purpose machining technique, for example, a lathe and a drilling machine without the use of the special precision microfabrication technique. Actually, the microdevice 10 in accordance with the present invention of a type of fluid supply passage for four fluids (in FIG. 1A and FIG. 1B, fluid supply passage for three fluids), which was of a concentric cylindrical type and had the tapered portion 22A for flow contraction, was manufactured with a lathe (general-purpose machining technique) using an acrylic resin material. As the result, a microdevice could be manufactured in which the opening width Wa of the mixing reaction flow path 56 was 225 μm, the total opening width Wb of the four fluid supply passages was 2230 μm, and Wa/Wb was about 0.1. The opening width Wa of the mixing reaction flow path 56 after flow contraction is preferably not smaller than 1 μm and not larger than 1000 μm.

Since the fluid supply passages 50, 52 and 54 are of a multiple cylindrical construction as shown in FIG. 4B, it is preferable that a plurality of fluid supply pipes 38, 40 and 42 be arranged at equal intervals in the circumferential direction of the multiple cylindrical construction so that the fluids are supplied uniformly to the fluid supply passages 50, 52 and 54. FIG. 4B shows a case where four fluid supply pipes 38, 40 and 42 are provided at intervals of 90 degrees for the fluid supply passages 50, 52 and 54, respectively. In the case where the fluid supply passages 50, 52 and 54 are of a multiple cylindrical construction, if the opening widths W1, W2 and W3 of the fluid supply passages 50, 52 and 54 are equal to each other, the quantity of fluid supplied to the mixing reaction flow path 56 increases in the outside fluid supply passage. Therefore, in order to make the quantity of fluid supplied to the mixing reaction flow path 56 equal, it is necessary to make the opening width of the outside fluid supply passage smaller than that of the inside fluid supply passage.

Figure 6A:
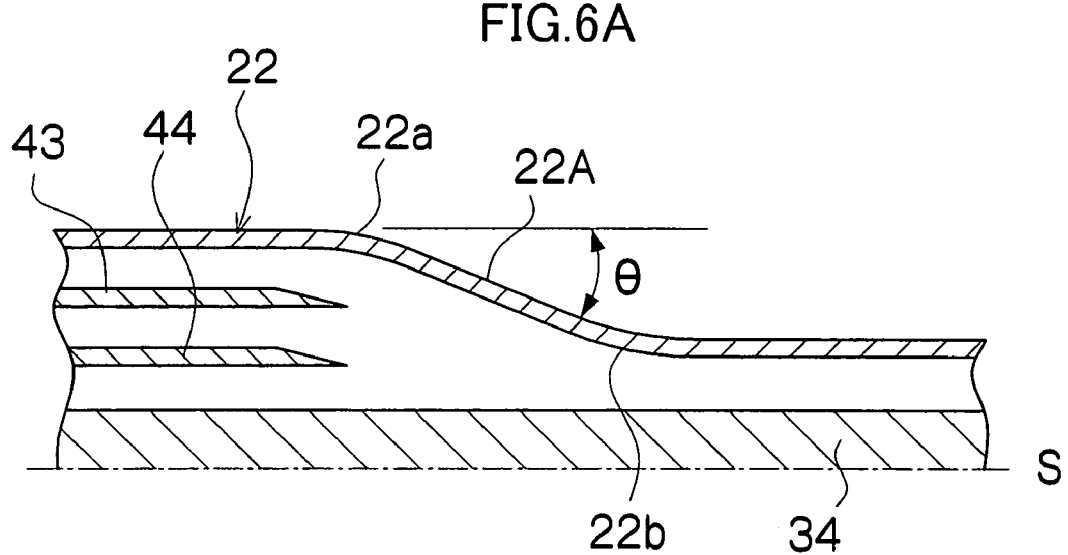
FIG. 6A and FIG. 6B are explanatory views for illustrating an angle of tapered portion where flow contraction is accomplished in a microdevice in accordance with the present invention.
Figure 6B:
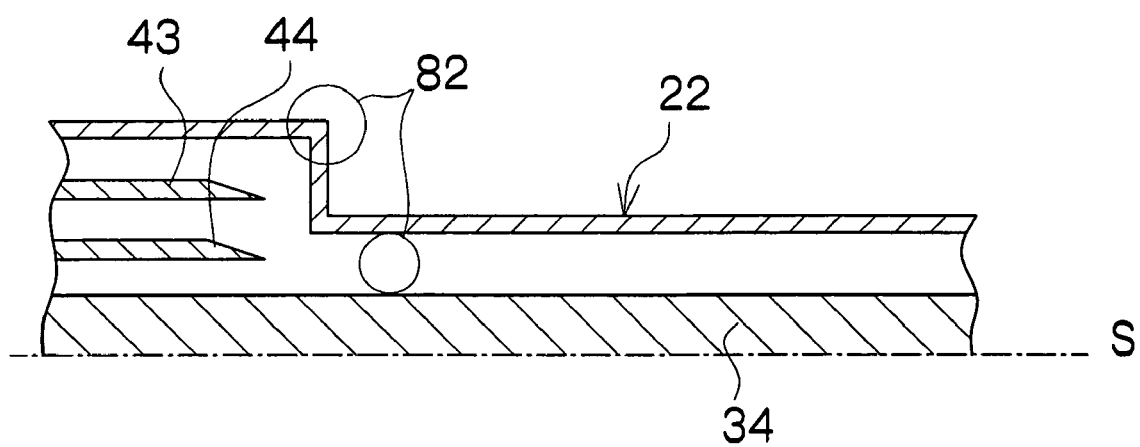

FIG. 6A and FIG. 6B show an inclination angle of the tapered portion 22A. As shown in FIG. 6A, the inclination angle θ of the tapered portion 22A is not smaller than 1° and not larger than 90° with respect to the axis S, preferably not smaller than 1° and not larger than 60°, further preferably not smaller than 1° and not larger than 30°. Since the flow is contracted gently without sudden contraction by this inclination angle, separation from the wall surface, eddy current, stagnation, etc. of fluid can be prevented. In this case, it is further preferable that the tapered portion 22A be made in a streamline shape by rounding a start position 22a (flow contraction start position) and an end position 22b (flow contraction end position) of the tapered portion 22A. Since the fluid is contracted smoothly by the streamline shape of the tapered portion 22A, separation from wall surface, eddy current, stagnation, etc. of fluid can further be prevented. On the other hand, if the inclination angle θ of the tapered portion 22A is made 90° or larger with respect to the axis S as shown in FIG. 6B, separation from wall surface, eddy current, stagnation, etc. of fluid is liable to occur at locations 82 indicated by circles in FIG. 6B.

Figure 7A:
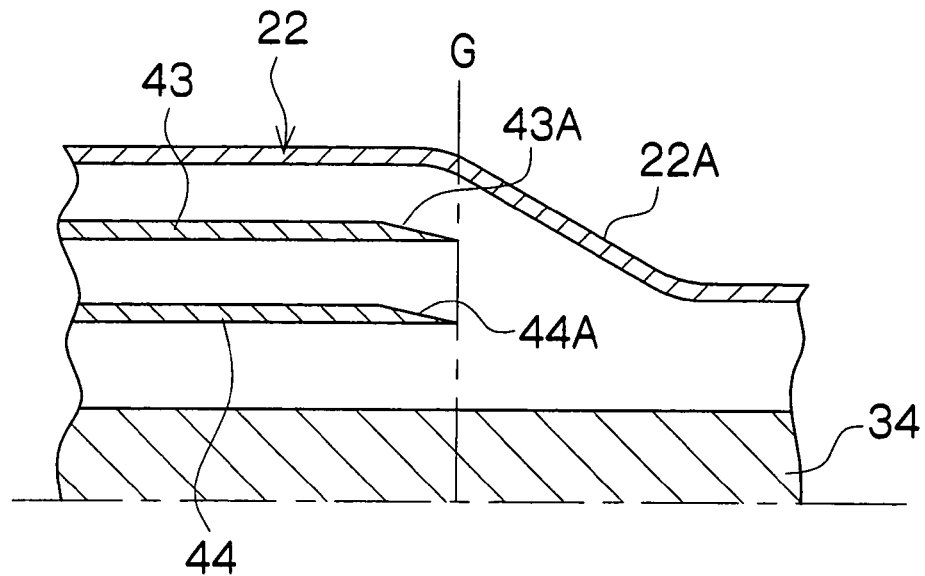
FIG. 7A to FIG. 7C are explanatory views for illustrating modes of flow contraction pattern.
Figure 7B:
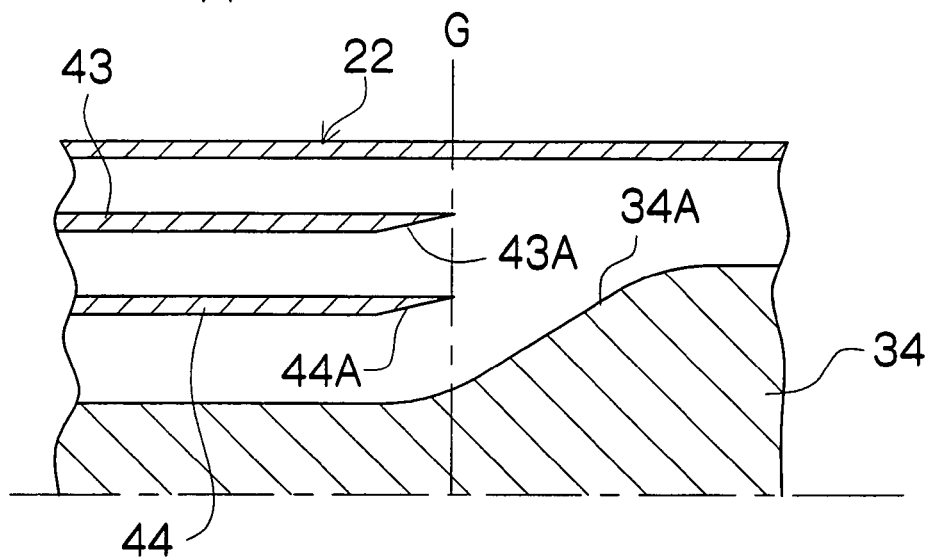
Figure 7C:
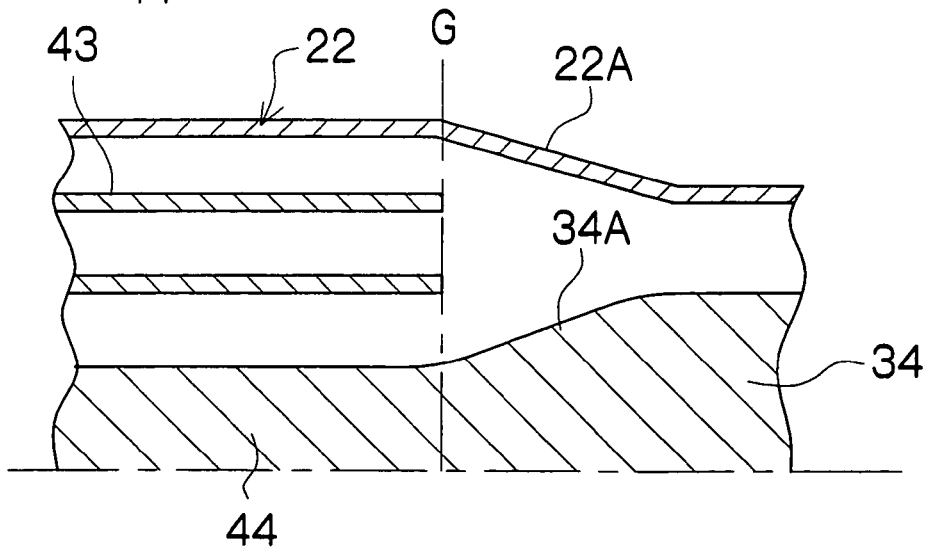

FIG. 7A to FIG. 7C show three modes of flow contraction. FIG. 7A shows a mode in which the flow is contracted by forming the tapered portion 22A on the tube member 22, FIG. 7B shows a mode in which the flow is contracted by forming a tapered portion 34A on the flow straightening member 34, and FIG. 7C shows a mode in which the flow is contracted by forming tapered portions 22A and 34A on both of the tube member 22 and the flow straightening member 34. From the viewpoint of manufacture, the mode shown in FIG. 7B provides manufacturing accuracy easily. However, in the case where it is desired to make an inclination gradient as small as possible when the flow is contracted, the mode shown in FIG. 7C in which the tapered portions 22A and 34A are formed on both of the tube member 22 and the flow straightening member 34 is favorable. The contraction mode may be selected from these three modes considering the degree of contraction, mixing properties or reaction properties of fluid to be handled, ease of manufacture of the microdevice 10, and the like. In this case, it is preferable that when the tapered portion 22A is formed on the tube member 22, the tapered portions 43A and 44A formed at the distal ends of the wall members 43 and 44 be substantially in parallel with the inclination of the tapered portion 22A, and when the tapered portion 34A is formed on the flow straightening member 34, they be substantially in parallel with the inclination of the tapered portion 34A. Symbol G designates a joining point of fluids.

Figure 8A:
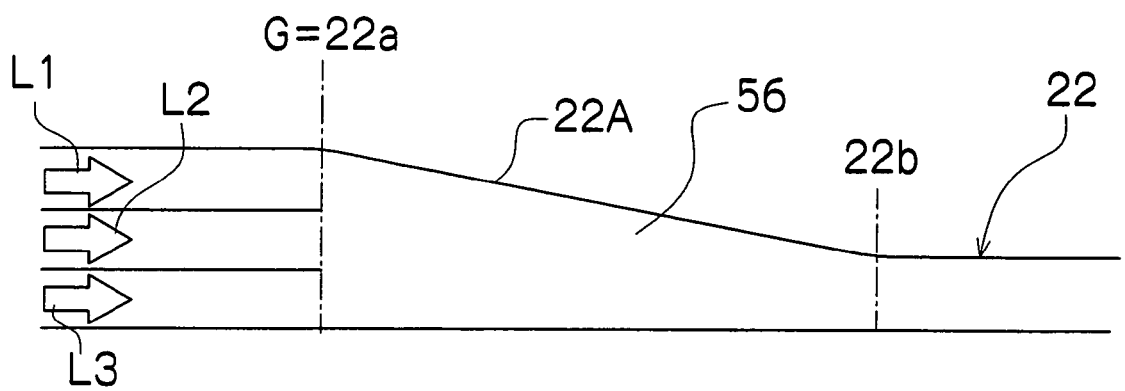
FIG. 8A to FIG. 8C are explanatory views for illustrating the relationship between a joining point of a plurality of fluids and a position where flow contraction starts.
Figure 8B:
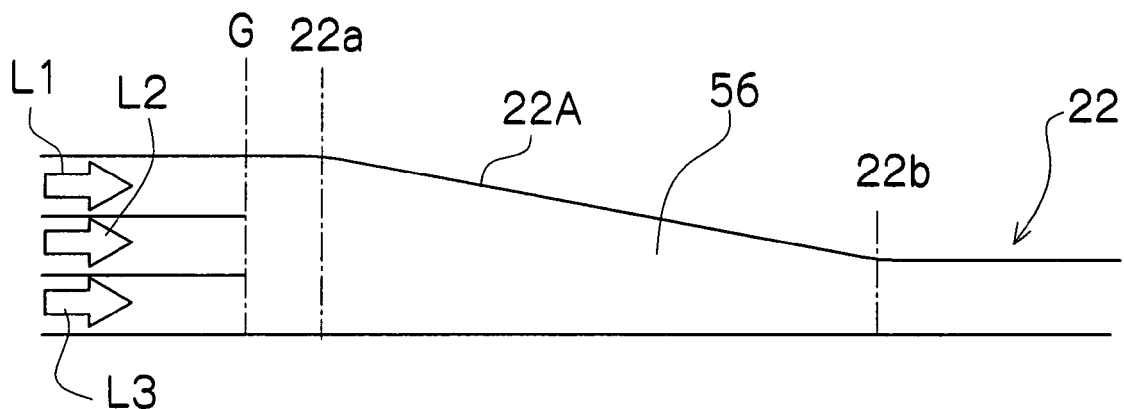
Figure 8C:
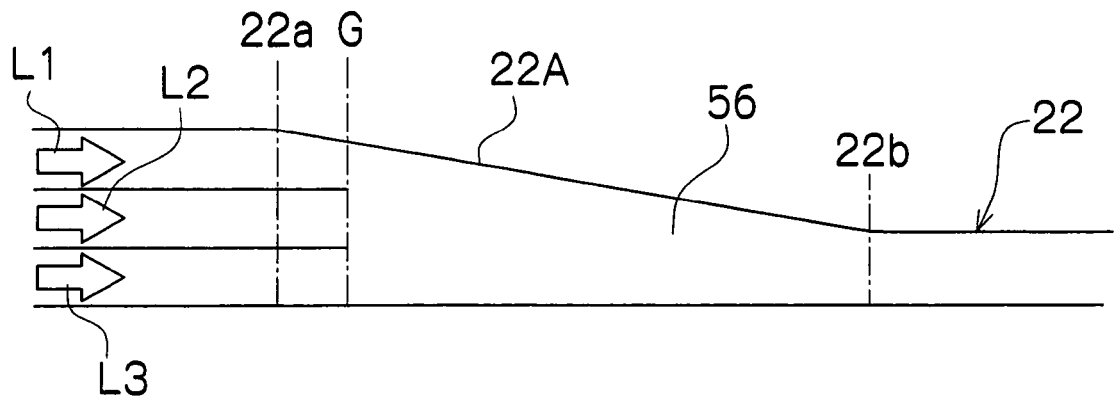

FIG. 8A to FIG. 8C are schematic views showing the relationship between the joining point G at which a plurality of fluids join together and the start position 22a of the tapered portion 22A at which contraction starts. This relationship is especially important when reaction due to diffusion mixing is handled in the microdevice 10 in accordance with the present invention. Specifically, the start position 22a of the tapered portion 22A at which contraction starts is set in front of the joining point G or at the joining point G or behind with respect to the joining point G at which the fluids join together according to the mixing properties (diffusion rate) and the reaction properties (reaction rate) of fluids to be handled. The reason for changing the start position 22a of contraction with respect to the joining point G according to the properties of fluid is that it is favorable to control the fluid thickness in the mixing reaction flow path 56 so that the diffusion mixing in the normal direction of the fluids and reaction finish at the discharge port 26. Although the start position 22a with respect to the joining point G does not such a big problem as in the case of mixing and reaction of batch system using a tank etc., even in the case of mixing and reaction in the microdevice 10, reaction does not proceed near the joining point G for fluids whose reaction is slow as compared with diffusion, so-called reaction rate-determining fluids, so that the flow may be contracted gradually. Therefore, in this case, the start position 22a of contraction may be set at the joining point G as shown in FIG. 8A, or the start position 22a of contraction may be set behind the joining point G as shown in FIG. 8B. However, for fluids whose reaction is fast as compared with diffusion, so-called diffusion rate-determining fluids, reaction takes place only at the contact interface near the joining point G before diffusion is not effected sufficiently, and the primary product yielded by this reaction successively undergoes reaction, so that there is a fear that a inhomogeneous reaction product is yielded. Therefore, the flow must be contracted as early as possible. For this reason, in this case, the setting of the start position 22a in front of the joining point G as shown in FIG. 8C is more favorable than the setting of the start position 22a at the joining point G as shown in FIG. 8A.

Figure 9A:
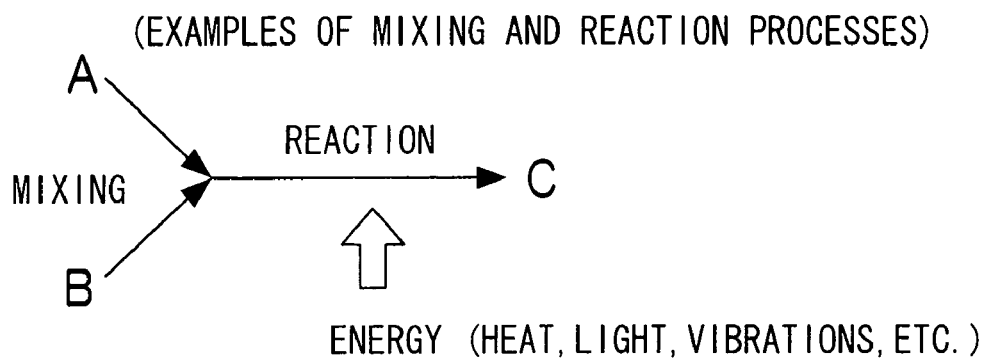
FIG. 9A to FIG. 9D are explanatory views for illustrating examples of mixing and reaction processes.
Figure 9B:
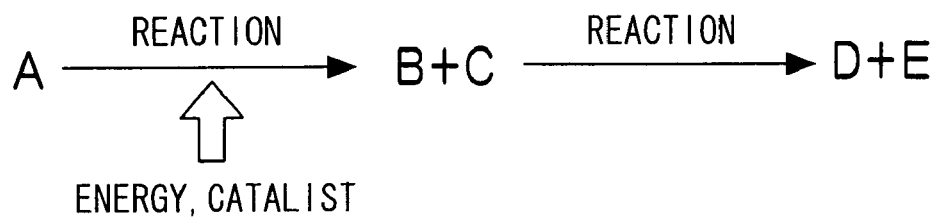
Figure 9C:
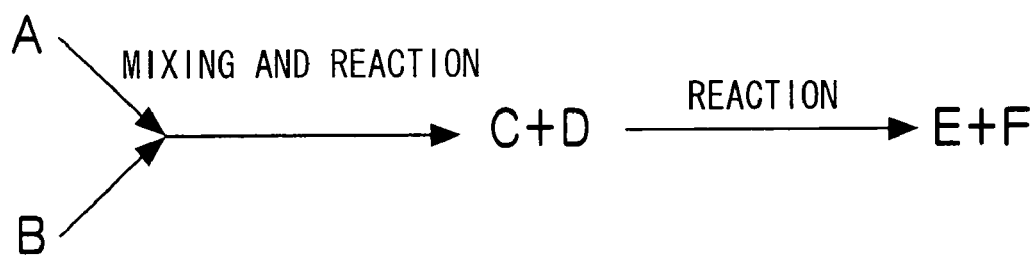
Figure 9D:
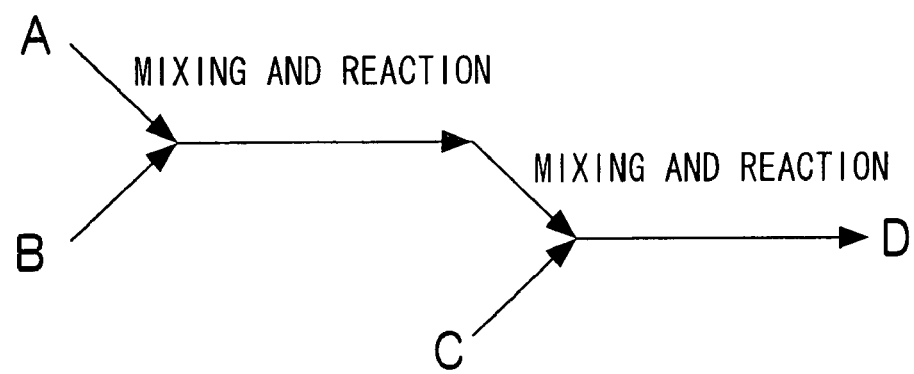

When a substance is synthesized by the mixing or reaction of three or more kinds of fluids, mixing and reaction are often combined, or reaction often takes place at many stages. FIG. 9A to FIG. 9D show examples of multistage mixing and multistage reaction processes. FIG. 9A shows a case where after a fluid containing substance A and a fluid containing substance B are mixed with each other, reaction is carried out by applying energy such as heat, light, or vibrations to synthesize substance C. FIG. 9B shows a case where a fluid containing substance A is allowed to react by energy, a catalyst, etc. to yield a primary product containing substances B and C, and further the substances B and C are allowed to react to synthesize substances D and E. FIG. 9C shows a case where a fluid containing substance A and a fluid containing substance B are mixed and allowed to react with each other to yield a primary product containing substances C and D, and further the substances C and D are allowed to react to synthesize substances E and F. FIG. 9D shows a case where while a fluid containing substance A and a fluid containing substance B are mixed and allowed to react with each other, a fluid containing substance C is added, and further the substances A, B and C are mixed and allowed to react with each other to synthesize substance D.

Figure 10A:
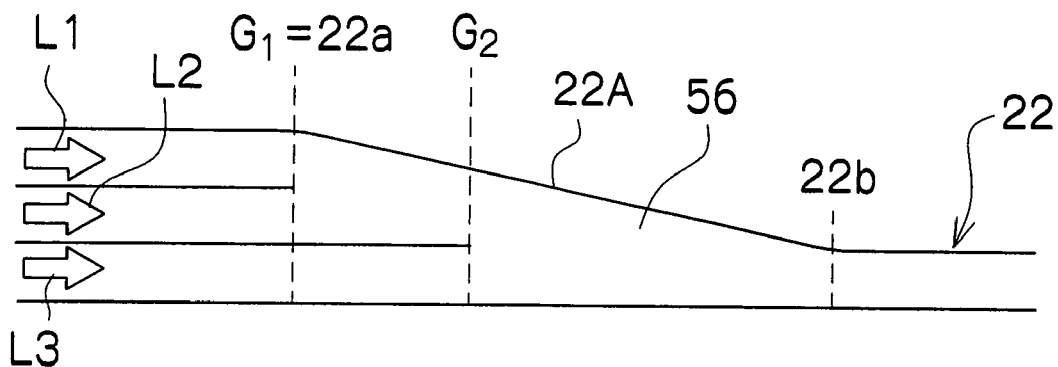
FIG. 10A to FIG. 10D are explanatory views for illustrating multistage mixing or multistage reaction and multistage flow contraction.
Figure 10B:
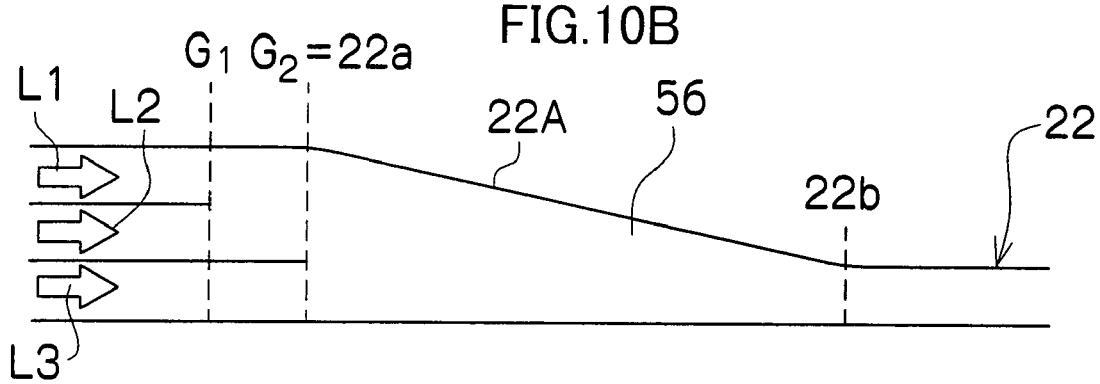
Figure 10C:
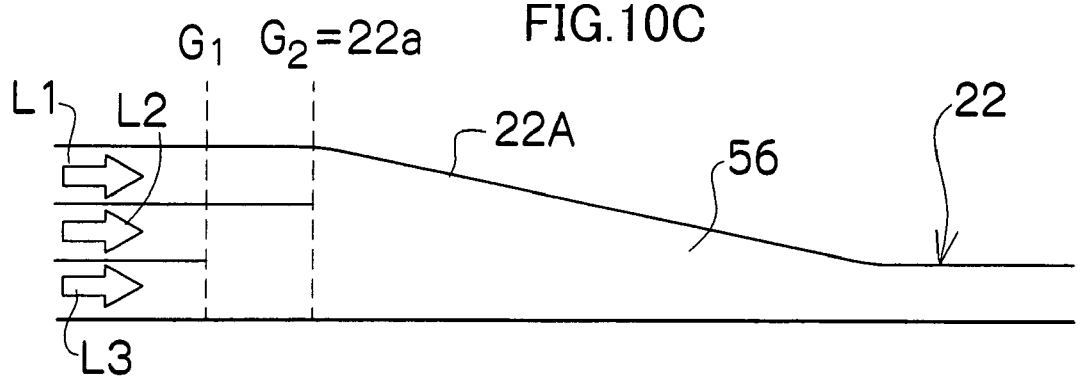
Figure 10D:
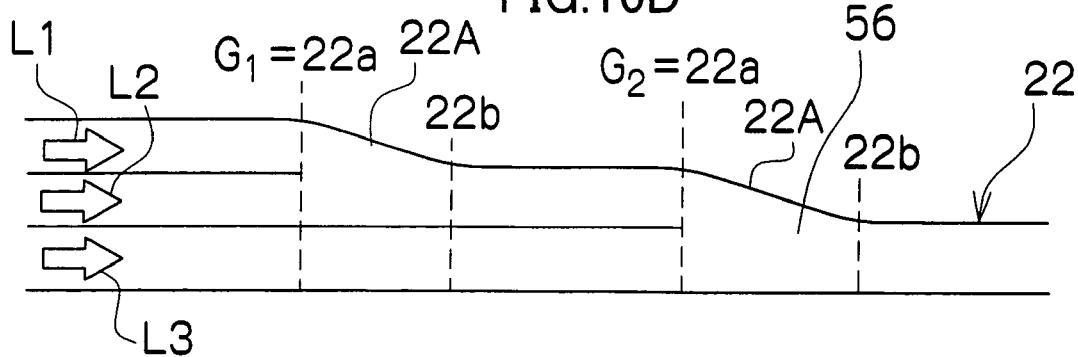

FIG. 10A to FIG. 10D show configurations that properly provide for multistage mixing or multistage reaction having a plurality of joining points G of fluids. The case shown in FIG. 10A to FIG. 10D is such that three or more kinds of fluids are joined together in consecutive order to effect multistage mixing or multistage reaction, and the multistage mixing or multistage reaction is combined with flow contraction. In this case, it is preferable that flow contraction be accomplished not one time only but at many stages according to the multistage mixing or multistage reaction. In the multistage mixing or multistage reaction shown in FIG. 10A, first, the fluid L1 and the fluid L2 are joined together and simultaneously contraction is started to effect first mixing or reaction, and then the fluid L3 is joined to the fluids L1 and L2 at a midway position of flow contraction to effect second mixing or reaction. In the multistage mixing or multistage reaction shown in FIG. 10B, first, the fluid L1 and the fluid L2 are joined together to effect first mixing or reaction, and then the fluid L3 is joined to the fluids L1 and L2 and simultaneously contraction is started to effect second mixing or reaction. In the multistage mixing or multistage reaction shown in FIG. 10C, first, the fluid L2 and the fluid L3 are joined together to effect first mixing or reaction, and then the fluid L1 is joined to the fluids L2 and L3 and simultaneously contraction is started to effect second mixing or reaction. In the multistage mixing or multistage reaction combined with multistage contraction as shown in FIG. 10D, first, the fluid L1 and the fluid L2 are joined together and simultaneously first-stage contraction is accomplished to effect first mixing or reaction, and after the mixing or reaction has been finished, the fluid L3 is joined together and simultaneously second-stage contraction is accomplished to effect second mixing or reaction. In this case as well, the start position 22a of contraction may be set in front of the joining point or at the joining point or behind with respect to the joining point G according to the mixing properties and the reaction properties of fluids to be handled.

Although not shown, a vibration generator or a microwave generator may be provided on the microdevice 10 in accordance with the present invention to accelerate mixing or reaction. Also, the microdevice in accordance with the present invention can be used not only as the device for mixing or reaction but also as a micro heat transfer device for heat exchange treatment, heat supply treatment, heat removal treatment, etc. or a microseparator for separation treatment, adsorption treatment, extraction treatment, absorption treatment, etc.

EXAMPLES

Example 1

Example of Reaction Using Fluorine Gas

Fluorinating reaction was carried out by using a Hastelloy-made microreactor (the opening width of the reaction flow path 56: 225 μm) having three fluid supply passages formed concentrically in a multiple cylindrical construction as shown in FIG. 2 as a microdevice.

As the heat medium C1 shown in FIG. 1A, a refrigerant of −20° C. was circulated to control the reaction temperature, as the fluids L1 and L3 shown in FIG. 2, 10 vol % fluorine gas in nitrogen was allowed to flow (5 mil/min), and as the fluid L2, ethyl acetoacetate (concentration: 10 wt %) diluted by F-113 (1,1,2-trichlorotrifluoroethane) was allowed to flow at a rate of 5 ml/min.

The analysis of the obtained reaction fluid LM performed by using a high-speed liquid chromatography revealed that 2-ethyl fluoroacetoacetate was obtained with a conversion yield of 80% and a selectivity coefficient of 95%. Also, the quantity of yielded 2,2-ethyl difluoroacetoacetate, which was yielded in quantities that cannot be ignored in the conventional flask reaction, was as small as 5% or less.

Example 2

Example of Synthesis of Organic Pigment

In example 2, synthesis of organic pigment was accomplished in accordance with the following reaction formula.

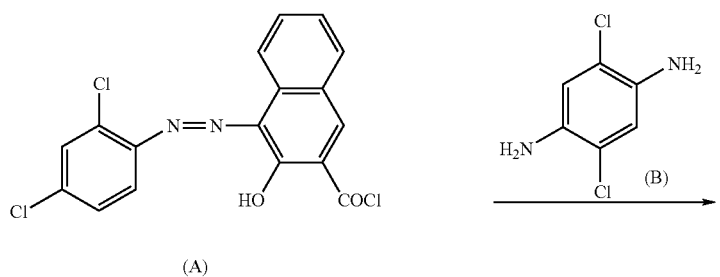

[Formula I]

-continued

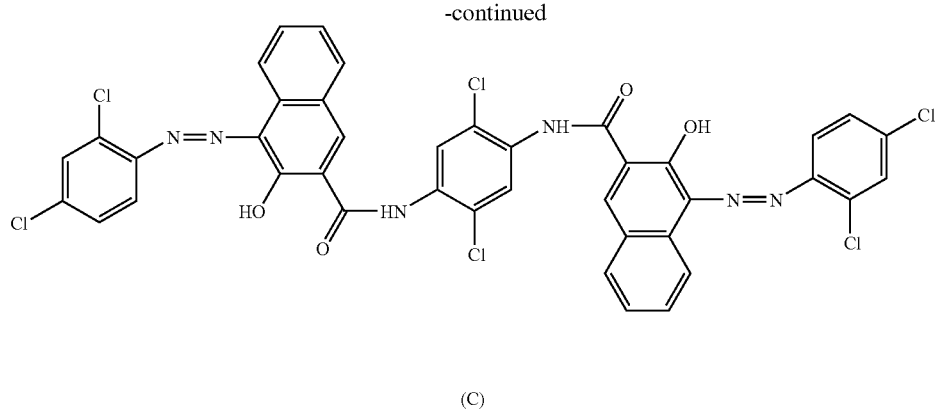

(C)

Organic pigment synthesizing reaction was carried out by using a stainless steel-made microreactor (the opening width of the reaction flow path 56: 225 μm) having three fluid supply passages formed concentrically in a multiple cylindrical construction as shown in FIG. 2 as a microdevice.

As the heat medium C1 shown in FIG. 1A, silicone oil heated to 180° C. was circulated to control the reaction temperature, and as the fluid L2 shown in FIG. 8A to FIG. 8C, 1,2-dichlorobenzene, which was a solvent, was allowed to flow.

As the fluid L1, a solution in which 37.9 g (0.1 mol) of the aforementioned compound (A) was suspended in 300 ml of 1,2-dichlorobenzene at 80° C. and as the fluid L3, a solution in which 8.9 g (0.05 mol) of the aforementioned compound (B) was dissolved in 300 ml of 1,2-dichlorobenzene and heated to 80° C. were allowed to flow at a rate of 6 ml/min by using a piston pump. The reaction fluid LM was poured in aqueous alkaline solution after flowing out of the discharge port 26 shown in FIG. 1A. The analysis of reaction fluid revealed that the yield of the obtained pigment (C) of the aforementioned compound (C) was 85% or higher.

Example 3

Example of Synthesis of Organic Silver Salt

Organic silver salt synthesizing reaction was carried out by using a stainless steel-made microreactor (the opening width of the reaction flow path 56: 225 μm) having three fluid supply passages formed concentrically in a multiple cylindrical construction as shown in FIG. 2 as a microdevice.

As the heat medium C1 shown in FIG. 1A, water of 35° C. was circulated to control the reaction temperature. As the fluid L1, aqueous solution of fatty sodium kept at 75° C. whose principal constituent was behenic acid (prepared by mixing 2.6 mol of fatty acid with 4.2 L of distilled water, 500 ml of aqueous solution of NaOH with a concentration of 5 mol/L, and 1.2 L of t-butanol and by agitating the mixture at 75° C. for one hour), as the fluid L2, distilled water of 40° C., and as the fluid L3, aqueous solution of silver nitrate kept at 10° C. (2.1 L of aqueous solution obtained by dissolving 400 g of silver nitrate in distilled water, pH 4.0) were allowed to flow at a rate of 10 ml/min by using a piston pump. The organic silver dispersion (LM) flowing out of the discharge port 26 shown in FIG. 1A was present relatively stably, and was dispersed substantially homogeneously.

What is claimed is:

1. A microdevice apparatus which manufactures materials and products by mixing or reaction of fluids in the fields of chemical industry and pharmaceutical industry, the microdevice comprising:
    an outer tubular member;
    a central member having an end;
    a mixing reaction flow path disposed between the outer tubular member and the central member; and
    a plurality of fluid supply passages which are positioned concentrically around the central member, in which a plurality of fluids are caused to pass respectively through the fluid supply passages and thereafter flow together in the mixing reaction flow path, the mixing reaction flow path being bound by a surface of said outer tubular member and a surface of said central member,
    wherein at least one of said surface of said outer tubular member and said surface of said central member has a tapered portion, such that a width of the mixing reaction flow path is reduced to contract the flow,
    wherein a temperature control device is provided to control a mixing temperature or a reaction temperature of the fluid flowing in said mixing reaction flow path; and
    wherein said surface of said outer tubular member and said surface of said central member are parallel downstream of said tapered portion.
2. The microdevice according to claim 1, wherein a width of said mixing reaction flow path after flow contraction is not smaller than 1 μm and not larger than 1000 μm.
3. The microdevice according to claim 1, wherein said fluid supply passages comprise:
    a cylindrical wall member between the central member and the outer tubular member;
    and
    a spacer disposed in at least one of the fluid supply passages, so as to correspond to a width of said at least one of the fluid supply passages,
    wherein said wall member is shorter than said central member and said outer tubular member in a flow direction, and the tapered portion is formed near a joining point of said fluids.
4. The microdevice according to claim 3, wherein the inclination angle of said tapered portion is not smaller than 1° and smaller than 90° with respect to the axis of said microdevice.
5. The microdevice according to claim 3, wherein said tapered portion is of a streamline shape.
6. The microdevice according to claim 1, wherein the microdevice is configured such that a start position of flow contraction of the fluids is set at one of: in front of a joining point of said fluids, at said joining point of said fluids, and behind said joining point of said fluids according to the mixing properties or reaction properties of said fluids.

7. The microdevice according to claim 1, wherein said fluids comprise three or more fluids, and lengths of the respective fluid supply passages are different so that said fluids are mixed or allowed to react with each other stepwise.

8. The microdevice according to claim 7, wherein a plurality of tapered portions are provided, such that the fluids are contracted at many stages.

9. The microdevice according to claim 1, further comprising a plurality of fluid supply ports which are arranged at equal intervals in a circumferential direction of said fluid supply passages.

10. The microdevice according to claim 1, wherein the microdevice is configured such that said fluids are diffused in a direction normal to the contact interface of said fluids while being allowed to flow as a thin layer shaped laminar flow, by which at least one of mixing and reaction is carried out.

11. The microdevice according to claim 1, wherein said fluid supply passages comprise multiple cylindrical elements which cause the fluids to be concentrically laminated in said mixing reaction flow path.

12. The microdevice according to claim 1, wherein the central member contains a heating medium.

13. The microdevice according to claim 1, wherein a jacket is provided around the outer tubular member and contains a heating medium.

14. The microdevice according to claim 1, wherein spacers are provided in the fluid supply passages.

15. The microdevice according to claim 14, wherein the fluid supply passages are defined by wall members and the spacers couple the wall members and the central member to the outer tubular member.

16. The microdevice according to claim 1, wherein the tapered portion is provided on said surface of said outer tubular member, and said outer tubular member has a diameter that decreases in the direction of flow.

17. The microdevice according to claim 1, wherein said tapered portion is provided on said surface of said central member, and said central member has a diameter that is increased in the direction of flow.

18. The microdevice according to claim 1, wherein the tapered portion is provided on said surface of said outer tubular member, and said end is disposed past said tapered portion in a direction of flow, such that a portion of said outer tubular member extended between said tapered portion and said end has a uniform diameter.

19. A microdevice comprising:
an outer tubular member;
a central member having an end, said central member including a hollow portion which extends in a longitudinal direction of said central member, said hollow portion housing a heat medium supply pipe which delivers a heating medium to the hollow portion;
a mixing reaction flow path disposed between the outer tubular member and the central member; and
a plurality of fluid supply passages which are positioned concentrically around the central member, in which a plurality of fluids are caused to pass respectively through the fluid supply passages and thereafter flow together in the mixing reaction flow path, the mixing reaction flow path being bound by a surface of said outer tubular member and a surface of said central member,
wherein at least one of said surface of said outer tubular member and said surface of said central member has a tapered portion, such that a width of the mixing reaction flow path is reduced to contract the flow.

20. The microdevice according to claim 19, wherein the heating medium circulates throughout the hollow portion of said central member.

21. The microdevice according to claim 19, wherein said heat medium supply pipe is disposed such that the heating medium is delivered to an end of the heat medium supply pipe and recirculates back along an outside of the heat medium supply pipe.

* * * * *